United States Patent

Tweed, Jr.

[15] 3,665,310

[45] May 23, 1972

[54] ADAPTER FOR CONVERTING AN AM RADIO RECEIVER INTO A CITIZENS BAND CHANNEL 9 TRANSCEIVER

[72] Inventor: Horace A. Tweed, Jr., Vallejo, Calif.

[73] Assignee: Sylvania Electric Products Inc.

[22] Filed: June 18, 1970

[21] Appl. No.: 47,428

[52] U.S. Cl. ................................325/21, 325/117, 325/355, 325/461

[51] Int. Cl. ..........................................................H04b 1/54

[58] Field of Search......................325/15, 16, 18, 19, 20, 21, 325/22, 312, 458, 459, 461; 343/175, 180

[56] References Cited

UNITED STATES PATENTS

| | | | |
|---|---|---|---|
| 3,447,088 | 5/1969 | Guyton, Jr. | 325/21 X |
| 3,371,278 | 2/1968 | Gelushia et al. | 325/16 |
| 2,959,644 | 11/1960 | Grace | 325/461 X |

*Primary Examiner*—Benedict V. Safourek
*Attorney*—Norman J. O'Malley, Russell A. Cannon and John F. Lawler

[57] ABSTRACT

This adapter circuit comprises a microphone, a transmitter operating only at 27.065 MHz, and a down converter. It can be used with any conventional amplitude modulated (AM) radio set in an automobile without necessitating any physical change in the car radio. It is connected between the existing cable plug on the antenna and the antenna jack on the radio. During normal operation, signals received by the antenna are directly connected to the radio which is responsive only to signals having frequencies in the AM radio broadcast band. Emergency messages are transmitted at 27.065 MHz by actuating a switch that connects the antenna to the output of the transmitter, and talking into the microphone. Received signals having frequencies of 27.065 MHz are reproduced by down converting such signals to approximately 1,600 kHz signals that are coupled to the radio, the radio being manually tuned to the latter frequency.

2 Claims, 1 Drawing Figure

Patented May 23, 1972 3,665,310
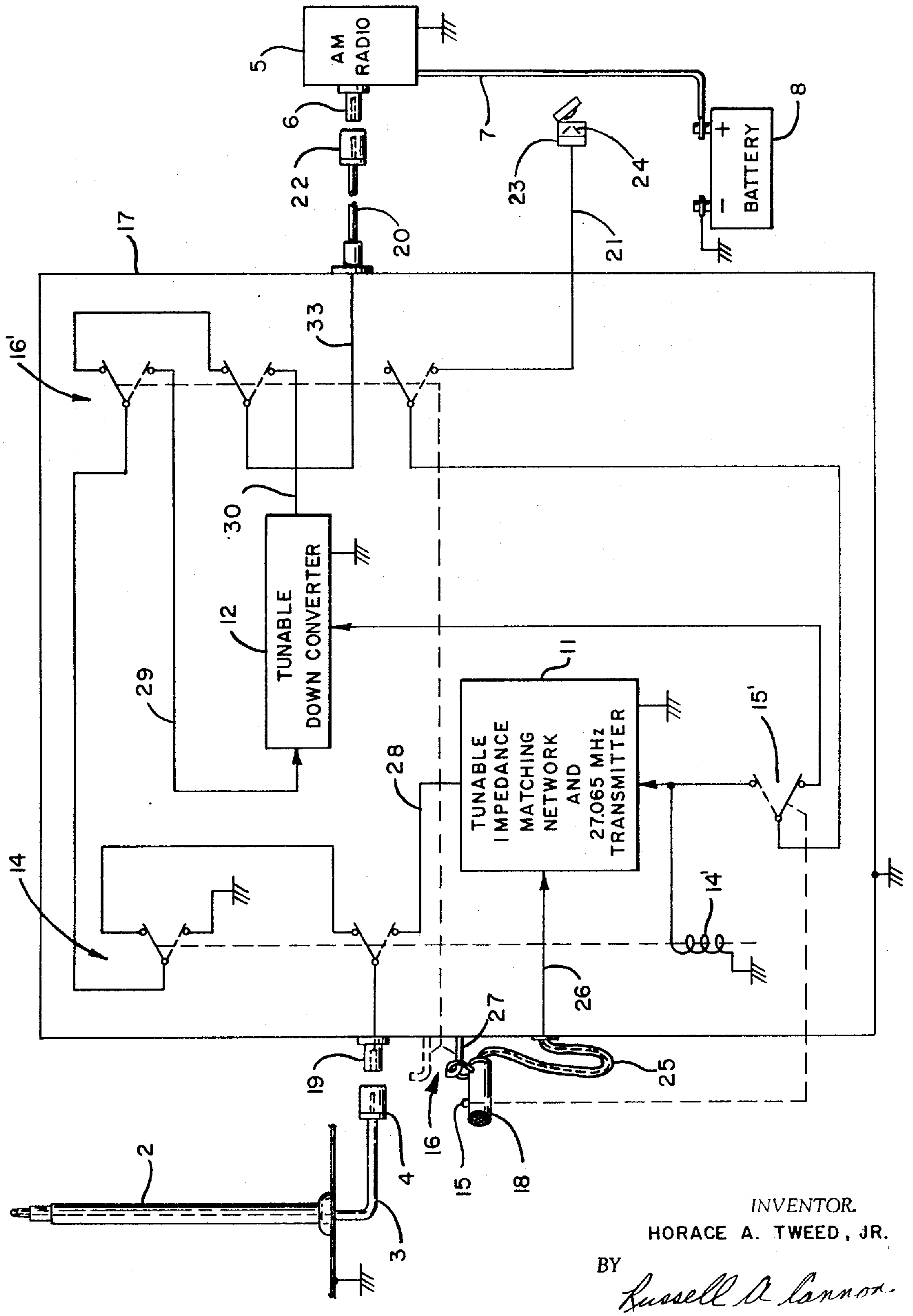
*INVENTOR.*
HORACE A. TWEED, JR.
BY Russell A. Cannon
AGENT

ADAPTER FOR CONVERTING AN AM RADIO RECEIVER INTO A CITIZENS BAND CHANNEL 9 TRANSCEIVER

BACKGROUND OF THE INVENTION

This invention relates to radio receivers and more particularly to circuitry for converting an AM radio receiver into a transceiver providing two-way emergency radio communications.

There are emergency situations that sometimes occur when one is away from a telephone that should be immediately reported to authorities. Such situations might involve the immediate safety to the life of an individual or the protection of property. By way of example, an individual driving in his car may witness an automobile accident or fire, a child may be lost in the mountains, a boat may run out of gas while cruising near a rocky shore, or one's own car may become disabled on a deserted portion of a highway. The only method presently available to most people for reporting such situations is to have someone go to a telephone and call the police. The few people who have citizens band radio equipment in their possession can immediately report emergency situations from remote locations by calling over any of the 23 citizen band channels to another radio operator. If another operator is listening to the channel used, and has access to a telephone, he can call the police.

The Federal Communications Commission (FCC) recently ruled that channel 9 (operating at a frequency of 27.065 MHz) of the citizens band radio service shall be used exclusively for emergency communications involving the immediate safety of the life of an individual or the immediate protection of property or necessary to render assistance to a motorist. It is planned that this channel will now be continuously monitored by authorities. This will enable a person having citizens band radio equipment to immediately communicate emergency messages directly to someone who can dispatch the needed assistance. Unfortunately, however, most people having AM radio receivers in their cars, for example, do not also have, and will not be willing to buy, expensive citizens band radio equipment. It is desirable to be able to convert a conventional AM radio set to a citizens band channel 9 transceiver.

An object of this invention is the provision of electrical circuitry for simply and economically converting an AM radio set to a citizens band channel 9 transceiver.

SUMMARY OF INVENTION

Briefly, the output of a transmitter operating only at 27.065 MHz is selectively connected to the antenna of an AM radio set to transmit emergency messages. AM broadcast band signals received by the antenna are selectively coupled directly to the radio. Received signals having a frequency of 27.065 MHz are selectively coupled to a down converter for conversion to a signal having a frequency in the AM broadcast band that is applied to the radio.

DESCRIPTION OF PREFERRED EMBODIMENT

Referring now to the schematic-block diagram of this invention in the attached drawing, a conventional AM radio receiver set in an automobile includes an antenna 2 having an associated interconnection cable 3 and plug 4, and an AM radio 5 having an input jack 6 connected thereto. The radio 5 is connected on line 7 to the car battery 8. In accordance with the prior art, the cable plug 4 is inserted into jack 6 to receive and reproduce on radio 5 AM broadcast band signals having frequencies between 535 kHz and 1,605 kHz.

The adapter embodying this invention comprises a transmitter 11, down converter 12, relay 14, and switch contacts 15' and 16' in an enclosure 17. Microphone 18, jack 19, and cables 20 and 21 having plugs 22 and 23, respectively, connected to one end thereof are secured to the enclosure. The adapter may be mounted under the dashboard of a car with screws (not shown). Alternatively, plug 22 may be rigidly secured to the enclosure as is jack 19. This plug 22 is then inserted into jack 6 in order to mount the adapter directly on radio 5. The adapter is electrically connected between the antenna and radio by disconnecting plug 4 from jack 6; connecting plug 4 to jack 19, connecting plug 22 to jack 6; and, attaching plug 23 to the existing power cable 7 of the radio.

Jack 19 and plug 22 are the same type as the jack 6 and plug 4, respectively, on the radio and antenna. Plug 23 is a snap-type connector having an electrically conductive knife edge 24 for piercing the insulation and contacting the wire in cable 7 when this plug is attached to the latter.

The microphone is electrically connected through a shielded cable 25 and line 26 to the transmitter. The shielding of cable 25 is electrically connected to the enclosure which is grounded. Microphone 18 hangs on the hook 27 of switch 16 when the microphone is not is use. A pushbutton switch 15 is located on the microphone although the contacts 15' thereof are shown on the drawing inside the enclosure for convenience.

Transmitter 11 is designed to operate only at the citizens band channel 9 frequency of 27.065 MHz. By way of example, the transmitter may comprise a modulator for combining the outputs of the microphone and a very stable crystal controlled oscillator operating at 27.065 MHz. The modulated signal is amplified and coupled through an impedance matching network to line 28. The matching network may be a tunable pi network comprising an inductor and a pair of capacitors. One of the capacitors is variable for optimizing the match between the transmitter and antenna as described more fully hereinafter.

Converter 12 is operative for down converting an input signal having a frequency of 27.065 MHz on line 29 to a signal on line 30 having a prescribed frequency within the AM broadcast band of approximately 1,600 kHz. The down converter may, by way of example, comprise a local oscillator and a mixer for combining the local oscillator signal and the input signal on line 29. The local oscillator signal has a frequency of 25.465 MHz in order to produce a 1,600 kHz beat frequency signal. The local oscillator is preferably tunable, for example by varying the capacitance of the tuned circuit of the oscillator, in order to adjust the frequency of the down-converted signal for a particular radio as is described more fully hereinafter.

The contact of relay 14 and switches 15 and 16 are connected as shown in solid lines in the drawing when the adapter is not in use to transmit or receive signals at 27.065 MHz. Switch 16 is a triple pole — double throw switch. The position of the microphone, and thus hook 27, determines the electrical connection made through the switch contacts 16'. When the microphone is hanging on hook 27 as shown in the drawing the switch 16 contact arms are in the position shown in solid lines for directly connecting jack 19 to plug 22. When the microphone is removed from hook 27 for transmitting or receiving signals at 27.065 MHz, the hook and switch 16 contact arms are in the position shown by the dashed lines. This connects jack 19 through line 29, the down converter, and lines 30 and 33 to plug 22. The converter is also connected through switch contacts 15' and 16' to plug 23 for connection to the car battery.

Pushbutton switch 15 is a single pole — double throw switch that is located on the microphone. Switch 15 is pressed to actuate the transmitter so that an emergency message can be transmitted. This causes the switch contacts 15' to move to the position shown in dashed lines to connect the transmitter and relay coil 14' to plug 23 for connection to the battery. When electrical current flows through and energizes relay coil 14', the associated relay contacts move to the position shown in dashed lines. This connects the output of the transmitter on line 28 to jack 19.

The adapter is installed in a car by connecting plugs 4 and 22 to jacks 19 and 6, respectively, and securing plug 23 to the power cable 7. It is desirable then to make two adjustments in the adapter. In order to optimize the match between the transmitter and the antenna, the microphone is removed from the hook 27, switch 15 is pressed, the antenna is extended to its full length, and a radio frequency (RF) monitor device is placed near the antenna to receive transmitted signals. The monitor may comprise an electromagnetic field strength meter, RF power meter or incandescent lamp. The variable capacitance, for example, in the impedance matching network is then adjusted to vary the loading on the antenna until the monitor indicates maximum power output from the antenna.

It is desirable to receive channel 9 signals on radio 5 at a prescribed frequency that can be easily selected on the latter by an inexperienced operator. This is accomplished by placing near the antenna 2 an operative 27.065 MHz reference transmitter that is modulated by an audio tone and turning the tuning dial on the radio to the mechanical stop at the high end of the AM broadcast band. With the microphone removed from hook 27, the down converter is tuned by varying the capacitance in the local oscillator tuned circuit, for example, until the audio tone is heard on the radio. Alternatively, the prescribed frequency may be any other frequency such as that of a known radio station in the AM band. These adjustments are made only upon installation of the adapter in the car.

In order to receive channel 9 emergency messages, radio 5 is turned on and tuned to the prescribed frequency and the microphone is removed from hook 27. 27.065 MHz signals received by the antenna are then coupled through the relay contacts, switch contacts 16', line 29, converter 12, and lines 30 and 33 to radio 5. Emergency messages are transmitted by pressing pushbutton switch 15 to connect the transmitter output signal on line 28 through the relay contacts to the antenna and talking into the microphone.

Although this invention is described in relation to an AM car radio, it may be used with other types of AM radios. Also, the adapter may include its own power source instead of being connected to the power supply of the radio. The attached claims therefore define the scope of this invention.

What is claimed is:

1. Apparatus for electrical connection between the cable plug on the antenna and the antenna jack on the receiver of a conventional radio for converting the latter to a channel 9 citizens band transceiver, comprising an enclosure, a connector jack on said enclosure similar to the antenna jack for connection to the cable plug, a connector plug on said enclosure similar to the cable plug for connection to the antenna jack, a microphone associated with said enclosure and adapted to convert a voice signal to an electrical output, said microphone having a switch thereon, a transmitter within said enclosure operating at 27.065 MHz and electrically connected to and responsive to the output of said microphone, a down converter within said enclosure and having an input and an output and adapted to convert an input signal having frequency of 27.065 MHz to an output signal having a prescribed frequency in the broadcast band of frequencies, first switch means in said enclosure electrically connected to said jack and to said plug and operative in one position to interconnect same whereby to couple said broadcast band signals from said antenna to said receiver, said first switch means in a second position electrically connecting said jack to the input of said down converter and connecting the output of the latter to said plug whereby said 27.065 MHz signals are heard on said radio when the latter is tuned to the prescribed frequency, and second switch means in said enclosure electrically connected to said jack and to the output of said transmitter and operative to electrically connect and disconnect same in response to the operation of said microphone switch whereby voice signals from said microphone are transmitted through said transmitter to said antenna.

2. Apparatus according to claim 1, wherein the radio is a conventional AM car radio located in an automobile having a battery and including means for selectively connecting said transmitter and down converter to the automobile battery.

* * * * *